Figure 1:
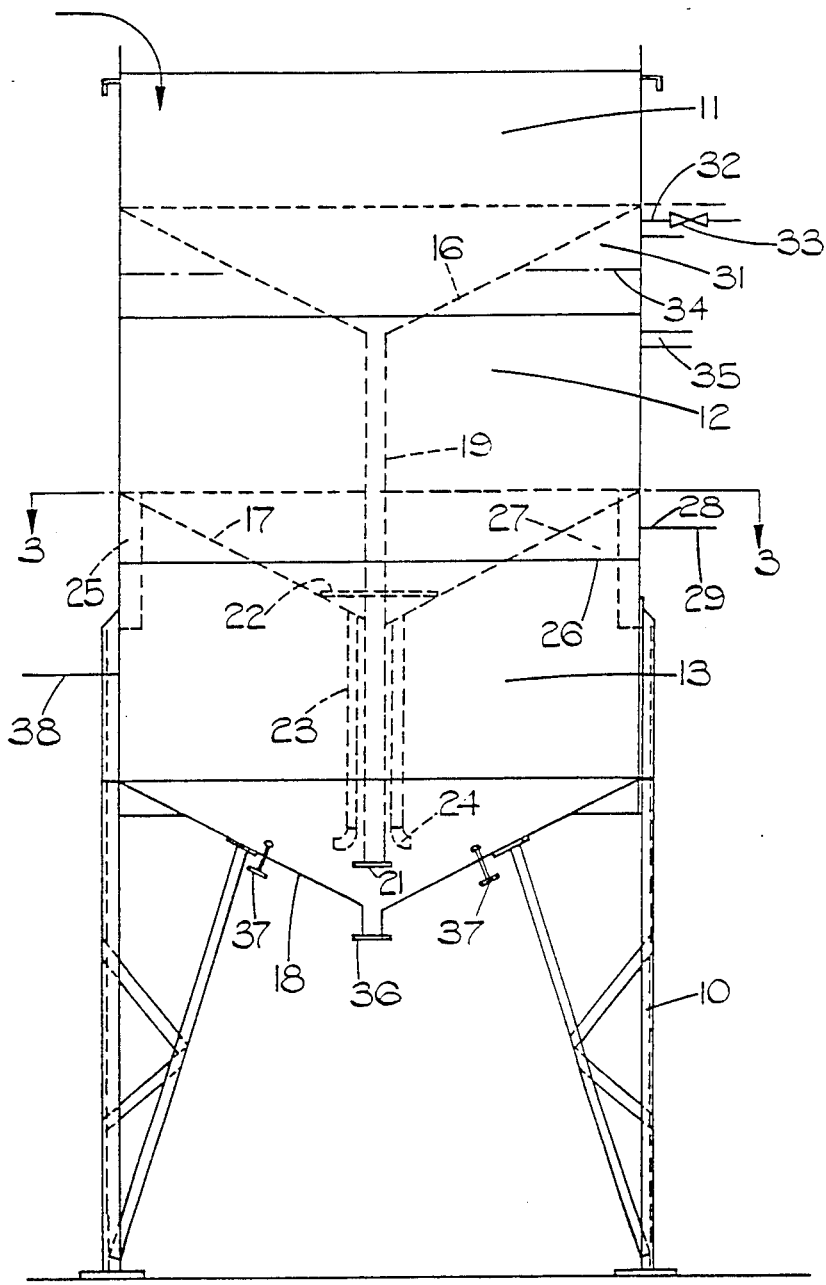

United States Patent [19]

Stafford et al.

[11] Patent Number: 4,726,899

[45] Date of Patent: Feb. 23, 1988

[54] APPARATUS FOR ANAEROBIC DIGESTION OF ORGANIC WASTE

[75] Inventors: David A. Stafford, Cardiff, Wales; Stephen P. Etheridge, Ithaca, N.Y.; Colin Genner, Gwent, Wales

[73] Assignee: Cardiff Laboratories for Energy & Resources Limited, Cardiff, Wales

[21] Appl. No.: 779,994

[22] Filed: Sep. 25, 1985

[51] Int. Cl.$^4$ .............................................. C02F 3/28
[52] U.S. Cl. ................................ 210/180; 210/187; 210/195.1; 210/262; 210/521
[58] Field of Search ............... 210/180, 603, 188, 218, 210/187, 195.1, 261, 262, 521, 539

[56] References Cited

U.S. PATENT DOCUMENTS

| | | | |
|---|---|---|---|
| 4,248,972 | 2/1981 | Fischer et al. | 210/180 X |
| 4,272,374 | 6/1981 | Baker | 210/180 |
| 4,302,329 | 11/1981 | Pfefferkorn | 210/180 X |
| 4,604,206 | 8/1986 | Sullivan | 210/603 |

Primary Examiner—Tom Wyse
Attorney, Agent, or Firm—Young & Thompson

[57] ABSTRACT

Apparatus for anaerobic digestion of organic waste material comprises a container divided into three interconnected chambers situated one below the other, the upper chamber being an inlet chamber, the lower chamber being a mixing chamber and the intermediate chamber being a settlement chamber, the inlet chamber having an inlet for material to be treated, a duct from the inlet chamber down into the mixing chamber, at least one transfer duct from the mixing chamber up into the settlement chamber, the duct or ducts extending below the upper extent of that mixing chamber, a gas collection zone at the upper extent of the mixing chamber, at least one recirculation duct from the base of the settlement chamber down into the mixing chamber, a further gas collection zone in the upper extent of the settlement chamber and an outlet from the settlement chamber situated below the further gas collection zone.

20 Claims, 4 Drawing Figures

APPARATUS FOR ANAEROBIC DIGESTION OF ORGANIC WASTE

This invention relates to apparatus for the anaerobic digestion of waste in which rapid and efficient processing is possible.

The principle of anaerobic digestion, which is well known, is that bacteriological activity can be encouraged within the waste material and this results in separation of solids and liquids and the production of gases including methane and carbon dioxide, normally mixed in various proportions. There have been proposed certain forms of apparatus for carrying out anaerobic digestion and these involve interconnected chambers through which materials to be treated are passed. The processing is usually carried out on a semi-continuous basis. In known equipment there is an inlet chamber into which the materials are delivered in measured quantities and from which they flow into a mixing chamber. From the mixing chamber they flow into a settlement chamber, from which a proportion is drawn off as cleared effluent and a further proportion is delivered back to the mixing chamber. Bacteria in the materials breakdown the constituents and yield a supply of gas and also an effluent of relatively uncontaminated water or other liquid, depending upon the raw material to be processed.

In one known form of the apparatus the chambers are housed in a composite structure with the inlet and settlement chambers situated side by side and above the mixing chamber. In this example the inlet and settlement chambers are generally half cylindrical and the mixing chamber is fully cylindrical, the three chambers making up a pair of cylindrers, each with a generally conical base and the upper one of course having a diametral division. The inlet and outlet are approximately at the same level and a gas outlet is provided in the region at the top of the mixing chamber above the liquid level therein. This arrangement provides a means of pressurising the gas from the head of liquid. Such apparatus is reasonably efficient and has been referred to as an hydraulic digester. The configuration chosen in this known apparatus however results in a fairly high wastage of bacteria and therefore a relatively contaminated effluent flow, though the time of digestion has an influence on this, in that the longer the digestion period the greater is the efficiency in terms of clean outflows.

Different organic materials can be treated in this type of apparatus and will produce varying yields of gas and clean water. It is normally desirable that the outflow of water should be clean enough to be discharged into rivers, sewers or other discharges. It is also desirable that as high a proportion of the gas as possible should be methane and therefore of the highest possible calorific value.

It is the object of this invention to provide apparatus for anaerobic digestion of organic waste materials which is efficient in terms of high methane content gas production, clean effluent outflow and in which these are produced within minimum digestion times.

In accordance with the present invention there is provided apparatus for anaerobic digestion of organic waste material comprising a container divided into three inter-connected chambers situated one below another, the chambers comprising an inlet chamber, with an inlet for material to be treated, a mixing chamber below the inlet chamber and a settlement chamber between the inlet and mixing chambers, a duct leading from the inlet chamber downwardly into the mixing chamber, a transfer duct leading from the mixing chamber upwardly into the settlement chamber, said duct extending from a level in the mixing chamber below the upper extremity thereof, and said mixing chamber defining an upper zone above the level of the lower end of the transfer duct in which, in use, gas is trapped and at which a gas outlet is situated, a recirculation duct from the base of the settlement chamber leading downwardly into the mixing chamber for recirculating liquids from the settlement chamber into the mixing chamber and the settlement chamber also defining an upper zone in which, in use, gas is trapped and a further gas outlet being situated at this zone, and the settlement chamber having an outlet for liquids below said upper gas zone.

Conveniently, the chambers make up a composite cylindrical structure with each chamber of cylindrical form and the case of each chamber being generally funnel like, the duct from the inlet chamber to the mixing chamber and the recirculation duct from the settlement chamber to the mixing chamber being connected at or near the centres of the funnel like bases of the respective chambers, the transfer duct leading from the mixing to the settlement chamber being at or near the periphery thereof. Alternatively, this may be positioned near to the centre.

Preferably a single central duct extends from the inlet chamber to the mixing chamber and plural ducts extend between the mixing and settlement chambers.

Advantageously the funnel shapes of the chambers next above define the upper gas zones at the tops of the settlement and mixing chambers respectively.

The lower outlet end of the or each duct leading from the inlet chamber to the mixing chamber may be shaped or arranged to generate directional flow change to promote mixing. Similarly the lower outlet end or ends of the or each recirculation duct may be shaped or arranged to generate directional flow change to promote mixing. Cooling of the settlement chamber may be achieved, using coils through which the inflowing mixture is passed.

Advantageously the liquid from the mixing chamber may be drawn off, heated through a heating device and returned to that chamber.

Conveniently, an outlet at the base of the mixing chamber is provided for removal of solids or residues from the process. Preferably there are single walls between the respective chambers to promote heat exchange, and more particularly between the settlement and inlet chambers.

Conveniently, the outlet from the upper gas zone and the outlet for effluent liquid are situated near the top of the settlement chamber so that, in use, a high liquid level is maintained to ensure that the apparatus remains relatively full of liquids.

Figure 2:
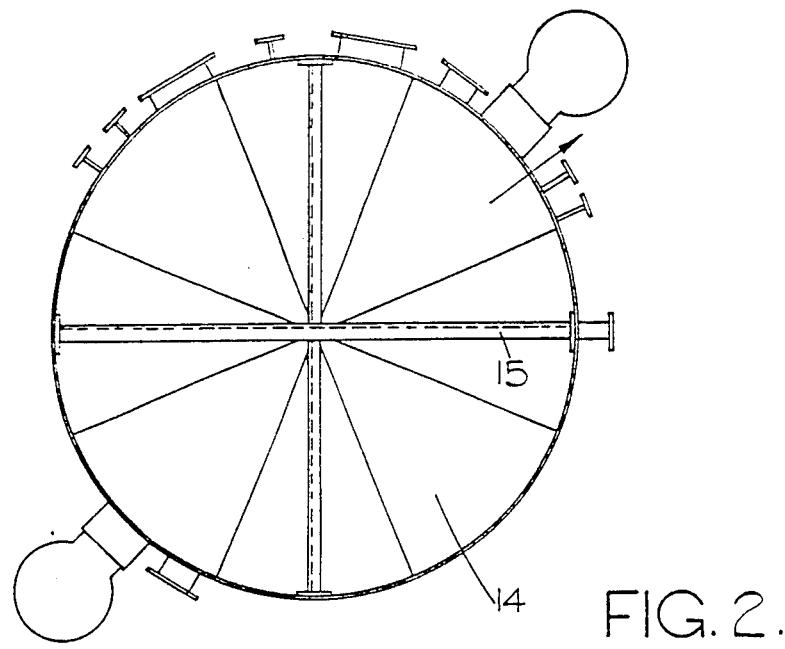
Figure 3:
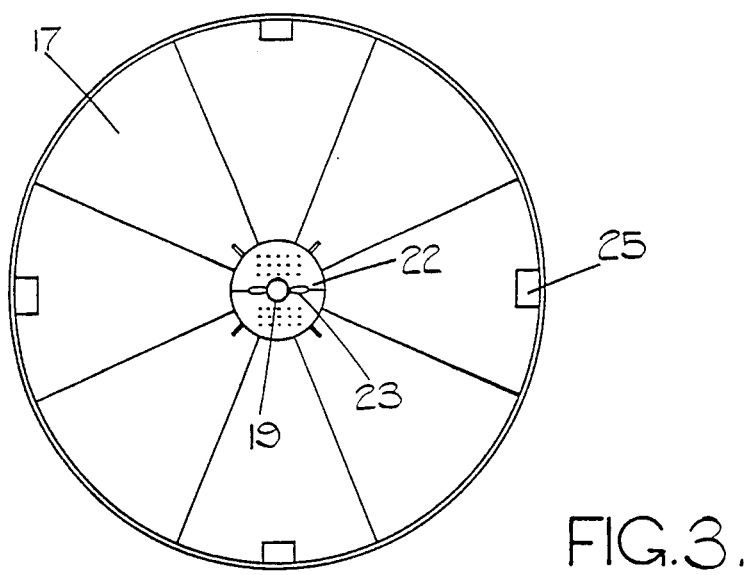
Figure 4:
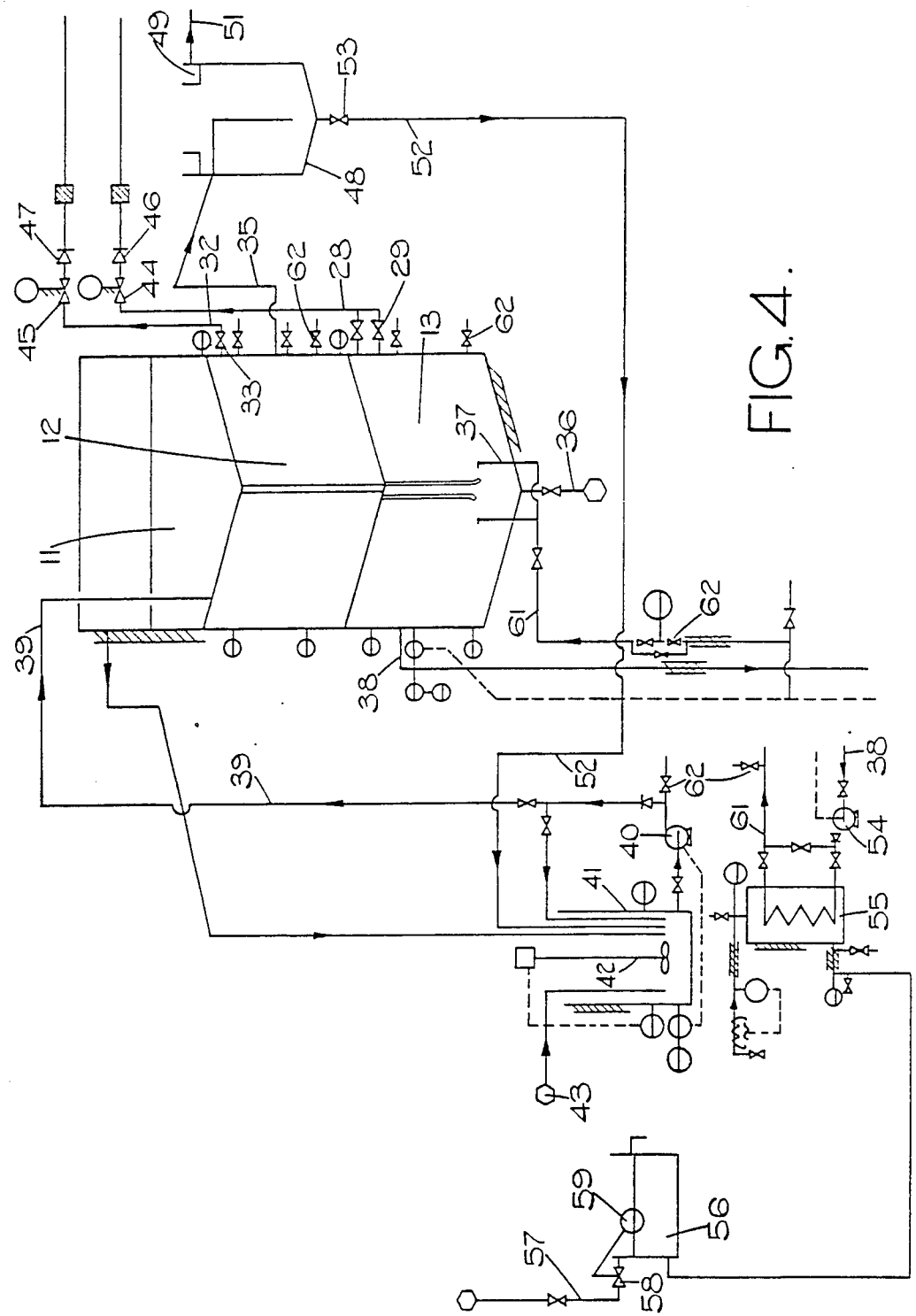

The invention will now be described by way of example with reference to the accompanying drawings in which:

FIG. 1 is a side elevation view of an anaerobic digestion apparatus constructed in accordance with the invention, FIG. 2 is a plan view of the apparatus, FIG. 3 is a cross-section on the line 3—3 in FIG. 1, FIG. 4 is diagrammatic layout of the apparatus shown in FIG. 1 together with associated equipment.

The apparatus illustrated is intended for use as an hydraulic anaerobic digester and as shown in FIGS. 1, 2 and 3 comprises a generally cylindrical structure mounted on support legs 10 or into concrete or other supporting structure. The structure is divided into three chambers 11, 17 and 13, disposed one on top of another and each having a generally cylindrical external form. The upper chamber 11, called the inlet chamber, has a lid 14 shown in FIG. 2 and having reinforcement 15. The inlet chamber 11 has a conical base wall 16 which forms the top wall of the second chamber 12. This is a settlement chamber and also has a conical base wall 17 which in turn serves as the top wall of the lower, mixing chamber 13. The mixing chamber 13 also has a conical base wall 15 which forms the bottom wall of the cylindrical structure. The intermediate walls 16, 17 dividing the three chambers are of single skin so that heat exchange can take place between liquids contained in the respective chambers. Further reference to this will be made later.

The cylindrical structure may be made of steel or other rigid material and may, in part, be insulated externally if required.

From the base of the inlet chamber 11 extends a concentric tube 19 leading to a point near the base of the mixing chamber 13. The lower end of this tube has one or more outlets and a deflector plate 21 serving to distribute liquid flowing down from the inlet chamber into the mixing chamber to promote mixing. The tube 19 is sealed from the interior of the intermediate or settlement chamber 12. In the base of the settlement chamber 12, however, there is a grid 22 serving as a support grid for packing material in the bottom of the settlement chamber and below this are tubes 23 which lead from the bottom of the settlement chamber down into the mixing chamber 13 and have angled discharge outlets 24 directed into the mixing chamber, again so as to promote mixing. There are two or more of these tubes 23 situated at opposite sides of the central tube 19, as shown in FIG. 3.

At the periphery of the cylinder and affording communication between the mixing chamber 13 and the settlement chamber 12 are ducts 25 of rectangular, circular or other form. There are four or more of these, as seen in FIG. 3, and each has its lower end substantially below the conical wall 17 dividing the settlement and mixing chambers 12 and 13. Alternatively, these ducts 25 may be positioned near the centre of the chamber. The line 26 in FIG. 1 represents the normal liquid level in the mixing chamber 13 and it will be seen that the ducts 25 have their lower ends substantially below this normal level.

Liquid to be treated enters through an inlet duct (not seen) and normally fills the inlet chamber 11 which serves, in part, as a storage container. The liquid flows as required down the duct formed by the tube 19 into the base of the mixing chamber 13. The liquid is charged with bacteria and if necessary additional bacteria can be added to the mixing chamber to cause reaction and breakdown of the organic material. The liquid flows through the transfer ducts formed by the rectangular, circular or other ducts 25 into the settlement chamber 12. Entry therefore takes place at points substantially higher than the bottom of the settlement chamber. In the settlement chamber the heavier liquids and any solids tend to fall to the bottom and tend to flow through the recirculation ducts formed by the tubes 24 down into the central region of the mixing chamber where they are re-mixed with the liquid contained in that chamber.

As indicated by the line 26 the normal liquid level in the mixing chamber 13 is below the upper extremity of that chamber and a zone is therefore defined at 27 into which any gas driven off the liquid tends to accumulate. The gas zone 27 communicates with an outlet 28 for such gas and this is controlled through a valve 29.

In the upper extremity of the settlement chamber 12 there is also a gas collection zone 31 and this also has an outlet connection 32 controlled by a valve 33. The normal liquid level is indicated by the line 34. The gas in the zones 27 and 31, when it comes into contact with the cooler walls of the apparatus, will tend to condense, to some extent. Any such condensation will remain in the apparatus and will therefore not cause air locks or other problems in the pipework.

In the cylindrical wall of the settlement chamber 12 there is at least one outlet 35 for liquids. This is near the upper end of the settlement chamber but not as high as the gas collection zone 31. From this, relatively clean water or other liquid can be drawn off, when required. In the base of the cylindrical structure there is central lower outlet 36 through which sludge can be taken from the base of the structure at intervals. This is in the base of a short well or sump so that solids tend to accumulate without becoming stirred up and mixed with the remainder in the mixing chamber 13.

Also in the base of the structure in the wall 18 there are inlets 37 for heated quantities of the mixture which can be drawn off from the mixing chamber at a level higher than these inlets 37. The outlet for this is indicated in FIG. 1 at 38.

Although not shown in the drawings, means may be provided for cooling the contents of the settlement chamber 12. This is achieved by means of a coil situated within that chamber and through which the inflowing mixture, or a proportion of that mixture, is passed.

Referring to FIG. 4 there is shown a system associated with an hydraulic anaerobic digester apparatus of the kind shown in FIGS. 1, 2 and 3. The apparatus itself is shown in FIG. 4 with the chambers 11, 12 and 13 identified. External connections include the inlet 39 for liquid to be treated, entering the inlet chamber 11 of the apparatus. The outlet connections 28, 32, with the respective valves 29 and 33 for gas, are shown. Also identified is the outlet 35 for water from the settlement chamber. The sludge outlet from the base of the apparatus is identified at 36. Also shown is the pair of inlets 37 for heated mixture and the outlet 38 for this mixture to be heated. Appropriate valves and controls associated with these inlets and outlets are shown in diagrammatic form.

The inlet 39 is seen in FIG. 4 to be connected through a pump 40 to the base of a balance tank 41. This contains an agitator 42 and is fed from a supply indicated at 43.

The gas outlet connections 28 and 32 are connected through respective pressure control valves 44, 45 and non-return valves 46, 47 to gas storage (not shown). The water outlet 35 from the settlement tank 12 is shown in FIG. 4 entering a further settlement tank 48. From the top channel 49 of this the water leaves through an outlet 51. Some of the sludge in this settlement tank is, however, recirculated through the system by drawing off a proportion through the base and into a pipe 52 controlled through a valve 53. The pipe leads into the first settlement tank 41 and from there it is able to recirculate through the main apparatus.

A proportion of the material in the mixing chamber 13 is drawn off and heated and returned to the apparatus as previously referred to. The outlet for such liquid at 38 takes the liquid through a pump 54 to a heat exchange unit 55. This contains water which is supplied from a header tank 56 fed from a pressurised supply 57 through a control valve 58 actuated by a level unit 59. The heat exchanger has a coil through which the mixture flows and is then returned to the inlets 37 in the base of the apparatus through a supply pipe 61. Other forms of heating, including steam injection, can be used.

A number of test outlets are provided in different parts of the apparatus in order that samples may be drawn off. These are controlled by respective valves and are identified by numeral 62. Further monitoring devices may be provided as required.

It is to be understood that the settlement tanks 41 and 48 may be omitted if the treatment of the particular material does not warrant the use of these. Normally the heating apparatus will be required but, in certain circumstances, it may be omitted also. Furthermore the various test facilities may be used or not, as required.

The inlet chamber may, in an alternative example, be sealed. This allows gassing from this chamber to be controlled.

In use the mixture enters the apparatus into the inlet chamber 11. Normally, this will take place at intervals, depending upon the length of time required to process the particular material. The liquid flows down into the mixing chamber 13 and is there thoroughly mixed so that bacteriological reaction starts to take place. The mixture flows upwardly into the settlement chamber 12 and a proportion of the heavier liquid and solids are recirculated into the mixing chamber, as previously described. A proportion of the liquid is drawn off through the outlet 35 and it is to be assumed that this is relatively uncontaminated. The degree of contamination will depend upon the constituents of the raw material and also upon the process time.

Gas, in the form of methane and carbon dioxide, will accumulate in the gas collection zones 27 and 31. The pressure of the gas in the zone 27 at the top of the mixing chamber will be higher than that in the top of the settlement chamber, and this will also ensure that lower proportions of carbon dioxide are dissolved out of the material in the mixing chamber than is the case in the settlement chamber, so that a higher methane proportion will normally be found in the gas in the lower of the two gas collection zones 27. Such gas will therefore have a higher calorific value.

In one example, the apparatus may contain fifty cubic metres of liquid to be treated. Five cubic metres a day may be added and proportional quantities of gas and liquid effluent taken off. The treatment period may be ten days. However, in certain circumstances, it is possible substantially to decrease the treatment period, for example to three days, but in so doing the relative contamination of the liquid effluent may be higher and gas production lowered. Heat exchange between the chambers, and particularly between the inlet chamber 11 and the settlement chamber 12, aids the bacteriological reactions. It is also desirable to allow a relatively long settlement period so that the microbes are re-cycled through the mixing chamber and are not drawn off in significant quantities through the effluent outlet 35.

To assist microbe multiplication and therefore to speed up the processing, the settlement chamber may contain elements upon which microbe growth can be stimulated. Typically, these elements are loose rings which are placed in the settlement chamber. Their function is greatly to increase the surface area available on which microbe growth can start and propagate. The rings may be made from an appropriate plastics material and onto these microbe development can take place up to a thickness of about 2 millimeters.

It is found that the pressure of the gas influences the methane proportion. In the lower gas collection zone 27 the gas may have 80-85% methane content, whereas in the upper gas collection zone 31 this may be reduced to 70%.

Further filtration and treatment equipment may be associated with the apparatus, if desired. The effluent water may for example be taken through an aerobic filter and further settlement tanks. The gas may be cleaned and stored in appropriate holder.

We claim:

1. Apparatus for anaerobic digestion of organic waste material comprising a container divided into three interconnected chambers situated one below another, and making up a composite cylindrical structure, each chamber having a base of generally funnel-like form, the chambers comprising an inlet chamber with an inlet for material to be treated, a mixing chamber below the inlet chamber, and a settlement chamber between the inlet and mixing chambers, a duct leading from the inlet chamber downwardly into the mixing chamber, said duct being connected at or near the center of the funnel-like base of the inlet chamber, a transfer duct leading from the mixing chamber upwardly into the settlement chamber, said duct being disposed near the periphery of the mixing chamber and extending from a level in the mixing chamber below the upper extremity thereof, and said mixing chamber defining an upper zone above the level of the lower end of the transfer duct in which, in use, gas is trapped and at which a gas outlet is situated, a recirculation duct from the base of the settlement chamber leading downwardly from a position at or near the centre of the funnel-like base of the settlement chamber, into the mixing chamber for recirculating liquids from the settlement chamber into the mixing chamber, and the settlement chamber also defining an upper gas zone in which, in use, gas is trapped and a further gas outlet being situated at this zone, and the settlement chamber having an outlet for liquids below said upper gas zone.

2. Apparatus as claimed in claim 1 in which a single central duct extends from the inlet chamber to the mixing chamber and plural ducts extend between the mixing and settlement chambers.

3. Apparatus as claimed in claim 1 in which the funnel-like bases of the inlet and settlement chambers define the respective upper gas zones at the tops of the settlement and mixing chambers respectively.

4. Apparatus as claimed in claim 1 in which a lower outlet end of the duct leading from the inlet chamber to the mixing chamber is arranged to generate directional flow change to promote mixing.

5. Apparatus as claimed in claim 1 wherein a coil is situated within the settlement chamber and means are provided for circulating through the coil fluids which in use are cooler than the contents of the settlement chamber, to tend to cool the contents of that chamber.

6. Apparatus as claimed in claim 5 in which the means for circulating fluid through said coil includes connections whereby at least a proportion of inflowing mixture to the apparatus is circulated therethrough.

7. Apparatus as claimed in claim 1 wherein a heating device is provided and connections are made between the heating device and the mixing chamber, mixture being, in use, drawn off from the mixing chamber, heated and returned to the mixing chamber.

8. Apparatus as claimed in claim 1 in which an outlet in the base of the mixing chamber is provided for removal of solids or residues from the process.

9. Apparatus as claimed in claim 1 wherein single walls are provided between the respective chambers to promote heat exchange.

10. Apparatus as claimed in claim 1 in which the outlet from the upper gas zone and the outlet for effluent liquid are situated near the top of the settlement chamber so that, in use, a high liquid level is maintained to ensure that the apparatus remains relatively full of liquids.

11. Apparatus for anaerobic digestion of organic waste material comprising a container divided into three interconnected chambers situated one below another, and making up a composite cylindrical structure, each chamber having a base of generally funnel-like form, the chambers comprising an inlet chamber with an inlet for material to be treated, a mixing chamber below the inlet chamber, and a settlement chamber between the inlet and mixing chambers, a duct leading from the inlet chamber downwardly into the mixing chamber, said duct being connected at or near the centre of the funnel-like base of the inlet chamber, a transfer duct leading from the mixing chamber upwardly into the settlement chamber, said duct being disposed at or near the center of the funnel-like base of the settlement chamber, and extending from a level in the mixing chamber below the upper extremity thereof and said mixing chamber defining an upper zone above the level of the lower end of the transfer duct in which, in use, gas is trapped and at which a gas outlet is situated, a recirculation duct from the base of the settlement chamber leading downwardly from a position at or near the centre of the funnel-like base of the settlement chamber, into the mixing chamber for recirculating liquids from the settlement chamber into the mixing chamber, and the settlement chamber also defining an upper gas zone in which, in use, gas is trapped, and a further gas outlet being situated at this zone and the settlement chamber having an outlet for liquids below said upper gas zone.

12. Apparatus as claimed in claim 14 in which a single central duct extends from the inlet chamber to the mixing chamber and plural ducts extend between the mixing and settlement chambers.

13. Apparatus as claimed in claim 11 in which the funnel-like bases of the inlet and settlement chambers define the respective upper gas zones at the tops of the settlement and mixing chambers respectively.

14. Apparatus as claimed in claim 11 in which a lower outlet end of the duct leading from the inlet chamber to the mixing chamber is arranged to generate directional flow change to promote mixing.

15. Apparatus as claimed in claim 11 wherein a coil is situated within the settlement chamber and means are provided for circulating through the coil fluids which, in use, are cooler than the contents of the settlement chamber, to tend to cool the contents of that chamber.

16. Apparatus as claimed in claim 15 in which the means for circulating fluid through said coil includes connections whereby at least a proportion of inflowing mixture to the apparatus is circulated therethrough.

17. Apparatus as claimed in claim 11 wherein a heating device is provided and connections are made between the heating device and the mixing chamber, mixture being, in use, drawn off from the mixing chamber, heated and returned to the mixing chamber.

18. Apparatus as claimed in claim 11 in which an outlet in the base of the mixing chamber is provided for removal of solids or residues from the process.

19. Apparatus as claimed in claim 11 wherein single walls are provided between the respective chambers to promote heat exchange.

20. Apparatus as claimed in claim 11 in which the outlet from the upper gas zone and the outlet for effluent liquid are situated near the top of the settlement chamber so that, in use, a high liquid level is maintained to ensure that the apparatus remains relatively full of liquids.

* * * * *